(12) United States Patent
Fischer (10) Patent No.: US 10,606,276 B2
(45) Date of Patent: Mar. 31, 2020

(54) USER DATA-BASED AUTONOMOUS VEHICLE SYSTEM

(71) Applicant: Faraday & Future Inc., Gardena, CA (US)

(72) Inventor: Evan Roger Fischer, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/721,085

(22) Filed: Sep. 29, 2017

(65) Prior Publication Data

US 2019/0049981 A1  Feb. 14, 2019

Related U.S. Application Data

(60) Provisional application No. 62/402,982, filed on Sep. 30, 2016.

(51) Int. Cl.
*G05D 1/02* (2020.01)
*B60W 50/08* (2020.01)
*G05D 1/00* (2006.01)
*G06N 20/00* (2019.01)

(52) U.S. Cl.
CPC .......... *G05D 1/0221* (2013.01); *B60W 50/08* (2013.01); *G05D 1/0011* (2013.01); *G05D 1/0088* (2013.01); *G05D 1/024* (2013.01); *G06N 20/00* (2019.01); *G05D 2201/0213* (2013.01)

(58) Field of Classification Search
CPC .... G05D 1/0221; G05D 1/0088; G05D 1/024; G05D 1/0011; G05D 2201/0213; B60W 50/08; G06N 20/00
See application file for complete search history.

(56) References Cited

U.S. PATENT DOCUMENTS

| 9,646,428 B1 * | 5/2017 | Konrardy ............... H04W 4/90 |
| 9,916,703 B2 * | 3/2018 | Levinson ............... G01S 15/931 |
| 10,185,999 B1 * | 1/2019 | Konrardy ............... G06Q 40/08 |
| 2014/0046506 A1 * | 2/2014 | Reichel ............. B62D 15/0285 701/2 |
| 2015/0070160 A1 * | 3/2015 | Davidsson ............ B60W 50/14 340/457 |

(Continued)

Primary Examiner — Mussa A Shaawat
(74) Attorney, Agent, or Firm — Skyler R. Lund (57) ABSTRACT

Examples of the disclosure are directed to using vehicle users' subjective evaluation of autonomous vehicle performance to adjust operation of one or more autonomous vehicle systems, such as an adaptive cruise control system. In some examples, a vehicle can perform an autonomous maneuver, and can use automotive sensors to collect data describing one or more quantitative aspects of that vehicle during the maneuver, such as make, model, GPS coordinates, mileage, speed, engine activity, or LIDAR data, among other possibilities. In some examples, a control system can receive subjective feedback inputted by the vehicle's user that indicates one or more qualitative evaluations of the completed autonomous maneuver. In some examples, a control system may perform statistical analysis of collected vehicle data and of subjective feedback input by vehicle users to identify correlations between quantitative vehicle parameters, specified types of user feedback and/or autonomous vehicle maneuvers.

11 Claims, 4 Drawing Sheets

FIG. 3

(56) References Cited

U.S. PATENT DOCUMENTS

| | | | | |
|---|---|---|---|---|
| 2015/0253772 A1* | 9/2015 | Solyom | ................ | G05D 1/0212 |
| | | | | 701/25 |
| 2016/0221575 A1* | 8/2016 | Posch | ............... | B60W 50/0098 |
| 2017/0101107 A1* | 4/2017 | Milch | ................... | B60W 50/14 |
| 2017/0123428 A1* | 5/2017 | Levinson | ............. | G05D 1/0214 |
| 2017/0124781 A1* | 5/2017 | Douillard | ............. | G01S 15/931 |
| 2017/0253254 A1* | 9/2017 | Sweeney | ............... | B60W 50/16 |
| 2017/0297578 A1* | 10/2017 | Braun | ................... | B60W 50/10 |
| 2017/0351261 A1* | 12/2017 | Levinson | ................ | G01S 17/42 |
| 2017/0364629 A1* | 12/2017 | Tarte | ........................ | B60Q 1/08 |
| 2018/0029610 A1* | 2/2018 | McNew | ............... | B60W 50/14 |
| 2018/0050698 A1* | 2/2018 | Polisson | ............ | B60W 30/182 |
| 2018/0089538 A1* | 3/2018 | Graham | ................ | G05D 1/021 |

\* cited by examiner

USER DATA-BASED AUTONOMOUS VEHICLE SYSTEM

FIELD OF THE DISCLOSURE

This application claims the benefit of U.S. Provisional Application No. 62/402,982, filed Sep. 30, 2016, the entirety of which is hereby incorporated by reference.

FIELD OF THE DISCLOSURE

This relates generally to automated driving and driving assistance systems, and more particularly, to such systems that account for subject user data.

BACKGROUND OF THE DISCLOSURE

Modern vehicles, especially automobiles, increasingly provide automated driving and driving assistance systems such as blind spot monitors, automatic parking, and automatic navigation. The quality and reliability of automated driving and driving assistance systems, however, can be difficult to determine given the nearly limitless scenarios in which vehicles may operate. The amount of resources required for quality control of automated operation is multiplied when considering that different users may subjectively evaluate substantially identical automated driving maneuvers differently.

SUMMARY OF THE DISCLOSURE

Examples of the disclosure are directed to using vehicle users' subjective evaluation of autonomous vehicle performance to adjust operation of one or more autonomous vehicle systems, such as an adaptive cruise control system. In some examples, a vehicle can perform an autonomous maneuver, and can use automotive sensors to collect data describing one or more quantitative aspects of that vehicle during the maneuver, such as make, model, GPS coordinates, mileage, speed, engine activity, or LIDAR data, among other possibilities. In some examples, a control system can receive subjective feedback inputted by the vehicle's user that indicates one or more qualitative evaluations of the completed autonomous maneuver. In some examples, a control system may perform statistical analysis of collected vehicle data and of subjective feedback input by vehicle users to identify correlations between quantitative vehicle parameters, specified types of user feedback and/or autonomous vehicle maneuvers. In some examples, a control system may determine to adjust operation of one or more autonomous vehicle systems based on an identified correlation between a vehicle parameter and negative user feedback. In many examples, the quality and reliability of autonomous vehicle systems may be improved by adjusting autonomous vehicle operation based on subjective feedback provided by the vehicles' users.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Modern vehicles, especially automobiles, increasingly provide automated driving and driving assistance systems such as blind spot monitors, automatic parking, and automatic navigation. The quality and reliability of automated driving and driving assistance systems, however, can be difficult to determine given the nearly limitless scenarios in which vehicles may operate. The amount of resources required for quality control of automated operation is multiplied when considering that different users may subjectively evaluate substantially identical automated driving maneuvers differently. Examples of the disclosure are directed to using vehicle users' subjective evaluation of autonomous vehicle performance to adjust operation of one or more autonomous vehicle systems, such as an adaptive cruise control system. In some examples, a vehicle can perform an autonomous maneuver, and can use automotive sensors to collect data describing one or more quantitative aspects of that vehicle during the maneuver, such as make, model, GPS coordinates, mileage, speed, engine activity, or LIDAR data, among other possibilities. In some examples, a control system can receive subjective feedback inputted by the vehicle's user that indicates one or more qualitative evaluations of the completed autonomous maneuver. In some examples, a control system may perform statistical analysis of collected vehicle data and of subjective feedback input by vehicle users to identify correlations between quantitative vehicle parameters, specified types of user feedback and/or autonomous vehicle maneuvers. In some examples, a control system may determine to adjust operation of one or more autonomous vehicle systems based on an identified correlation between a vehicle parameter and negative user feedback. In many examples, the quality and reliability of autonomous vehicle systems may be improved by adjusting autonomous vehicle operation based on subjective feedback provided by the vehicles' users.

In some examples of the disclosure, a learning algorithm can be implemented, such as a neural network (deep or shallow, which may employ a residual learning framework), and can be applied instead of, or in conjunction with, any processes described herein to solve a problem, reduce error, and increase computational efficiency. For example, a supervised learning algorithm may be implemented to improve autonomous vehicle maneuvers, as described below. Such learning algorithms may implement a feedforward neural network (e.g., a convolutional neural network) and/or a recurrent neural network, with supervised learning, unsupervised learning, and/or reinforcement learning. For example, a supervised learning algorithm may be implemented to improve analysis of subjective data, as described with reference to FIG. 3 below. In some examples, back-propagation may be implemented (e.g., by implementing a supervised long short-term memory recurrent neural network or a max-pooling convolutional neural network, which may run on a graphics processing unit). Moreover, in some examples, unsupervised learning methods may be used to improve supervised learning methods. Moreover still, in some examples, resources such as energy and time may be saved by including spiking neurons in a neural network (e.g., neurons in a neural network that do not fire at each propagation cycle).

Additionally, the terms: autonomous driving, autonomous vehicle, autonomously operating vehicle, autonomous operation, autonomous vehicle system, and/or automated vehicle are used interchangeably to refer to autonomous driving, partially autonomous driving, and/or driver assistance systems. Thus, an autonomous vehicle, as described herein, may refer to a vehicle that is configured to operate in a completely autonomous manner, and may also refer to driver assistance systems on a conventional user-operated vehicle. Moreover, an autonomous maneuver, as described herein, may refer to a semiautonomous maneuver, and/or a driver assistance system, as described in greater detail below.

Figure 1:
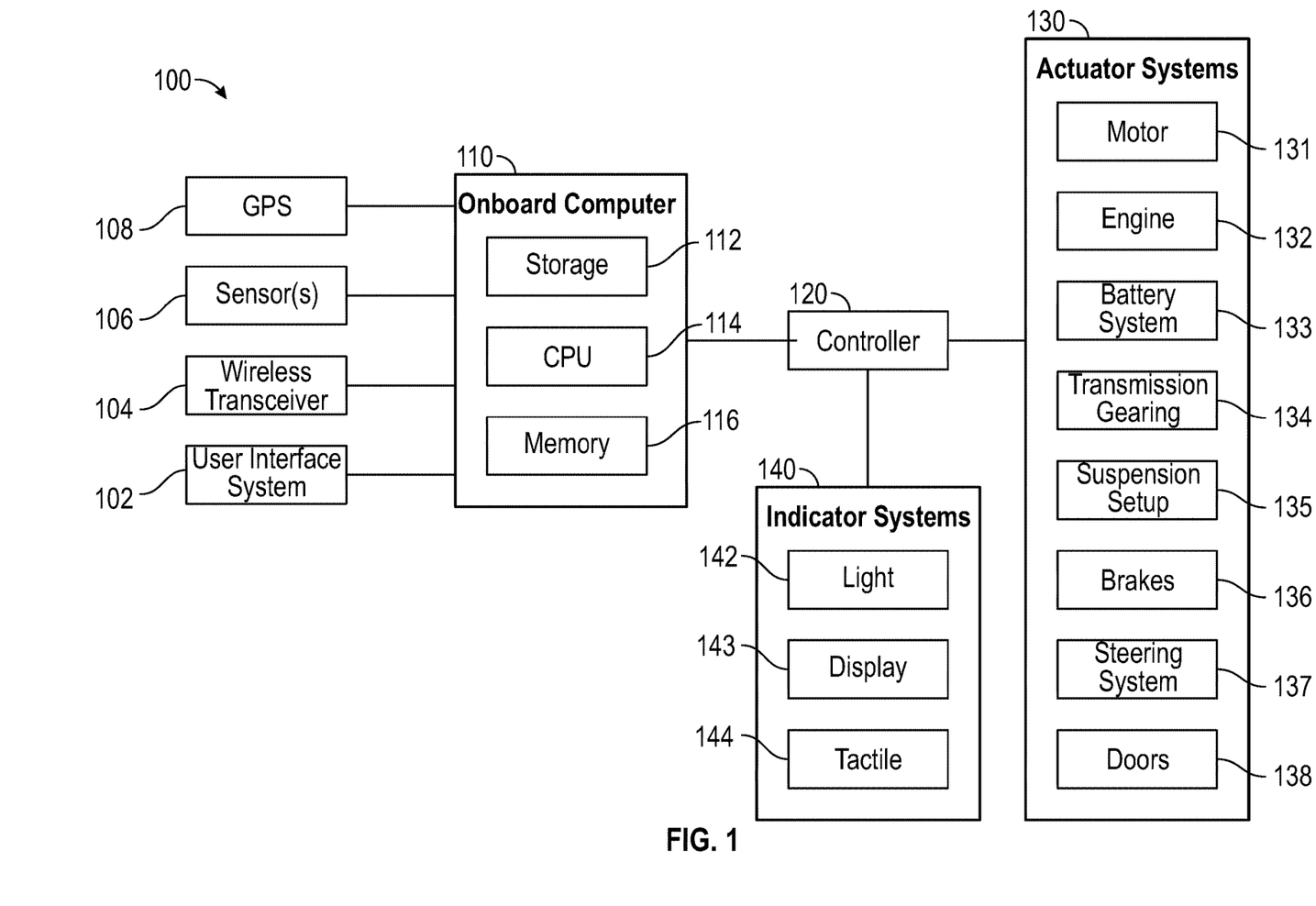
FIG. 1 illustrates an exemplary system block diagram of a vehicle control system including automated driving software according to examples of the disclosure.

FIG. 1 illustrates an exemplary system block diagram of a vehicle control system 100 including automated driving software according to examples of the disclosure. Vehicle control system 100 can perform autonomous maneuvers, automated driving and driving assistance, as described in this disclosure. In some examples, data collected by system 100 may be used to implement any of the algorithms or processes described herein.

System 100 can be incorporated into a vehicle, such as a consumer automobile. Other example vehicles that may incorporate the system 100 include, without limitation, airplanes, boats, motorcycles or industrial automobiles. Vehicle control system 100 may include user interface system 102 to receive subjective data from the vehicle's user (e.g., as a tactile or audio input). As described in greater detail with reference to FIG. 3 below, subjective data input by a user may indicate the user's perceptions regarding an autonomous (or semi-autonomous) maneuver performed by the vehicle. The user interface system 102 may include interface components such as microphones, physical controls, and/or one or more touchscreens, as described in greater detail below with reference to FIG. 2. Vehicle control system 100 can also include wireless transceiver 104 to enable communication of data to and/or from system 100. For example, transceiver 104 may enable automatic data buffering, data collection and storage via wireless communication with a remote server, database, or cloud based vehicle controller (e.g., system 400 of FIG. 4). System 100 can also include one or more sensors 106. In some examples, sensors 106 may be capable of collecting objective data to describe various characteristics of a single specific vehicle and its surroundings, as described in greater detail below with reference to step 304 of FIG. 3. Vehicle control system 100 can also include Global Positioning System (GPS) receiver 108 capable of determining the location of the vehicle.

Vehicle control system 100 can include an on-board computer 110 coupled to user interface system 102, wireless transceiver 104, sensors 106, and GPS receiver 108. On-board computer 110 can be capable of receiving objective (vehicle) data and subjective (user) data from one or more of the user interface system 102, the wireless transceiver 104, outputs from the sensors 106, and the GPS receiver 108. On-board computer 110 can include storage 112, memory 116, and a processor (central processing unit (CPU)) 114. CPU 114 can execute automated driving software stored in storage 112 and/or memory 114. For example, CPU 114 can process the user inputs, communication data, sensor outputs and GPS outputs and make driving decisions thereon. For example, processing can include detecting and tracking objects in the environment, tracking vehicle parameters (e.g., odometer, location), navigation planning, lane selection/change planning, motion planning, determining automated driving commands, etc. Additionally, storage 112 and/or memory 116 can store data and instructions for performing the above processing. Storage 112 and/or memory 116 can be any non-transitory computer readable storage medium, such as a solid-state drive, a hard disk drive or a random access memory (RAM) among other possibilities.

In some examples of system 100, the onboard computer 110 can analyze correlations between the subjective data received via user interface system 102 and the objective data collected via sensors 106. Alternatively, or in addition, in some examples of system 100, the analysis of correlations between the objective data collected from sensors 106 and the subjective data received via user interface system 102 can be split and/or offload with system 100 and another system, such as a server. For example, system 100 may collect the objective data via sensors 106, receive the subjective data via user interface system 102 and may communicate both the objective data and the subjective data to a server (e.g., using wireless transceiver 104) that can analyze and/or synthesize the communicated objective and subjective data.

The vehicle control system 100 can also include a controller 120 capable of controlling one or more aspects of vehicle operation based on automated driving commands received from the processor. In some examples, the vehicle control system 100 can be connected to (e.g., via controller 120) one or more actuator systems 130 in the vehicle and one or more indicator systems 140 in the vehicle. The one or more actuator systems 130 can include, but are not limited to, a motor 131 or engine 132, battery system 133, transmission gearing 134, suspension setup 135, brakes 136, steering system 137, and door system 138. The vehicle control system 100 can control, via controller 120, one or more of these actuator systems 130 during vehicle operation; for example, to open or close one or more of the doors of the vehicle using the door actuator system 138, to control the vehicle during autonomous driving or parking operations using the motor 131 or engine 132, battery system 133, transmission gearing 134, suspension setup 135, brakes 136 and/or steering system 137, etc. The one or more indicator systems 140 can include, but are not limited to, one or more lights 142 in the vehicle, one or more displays 143, one or more tactile actuators 144 in the vehicle (e.g., as part of a steering wheel or seat in the vehicle). The vehicle control system 100 can control, via controller 120, one or more of these indicator systems 140 to provide indications to a user of the vehicle.

Figure 2:
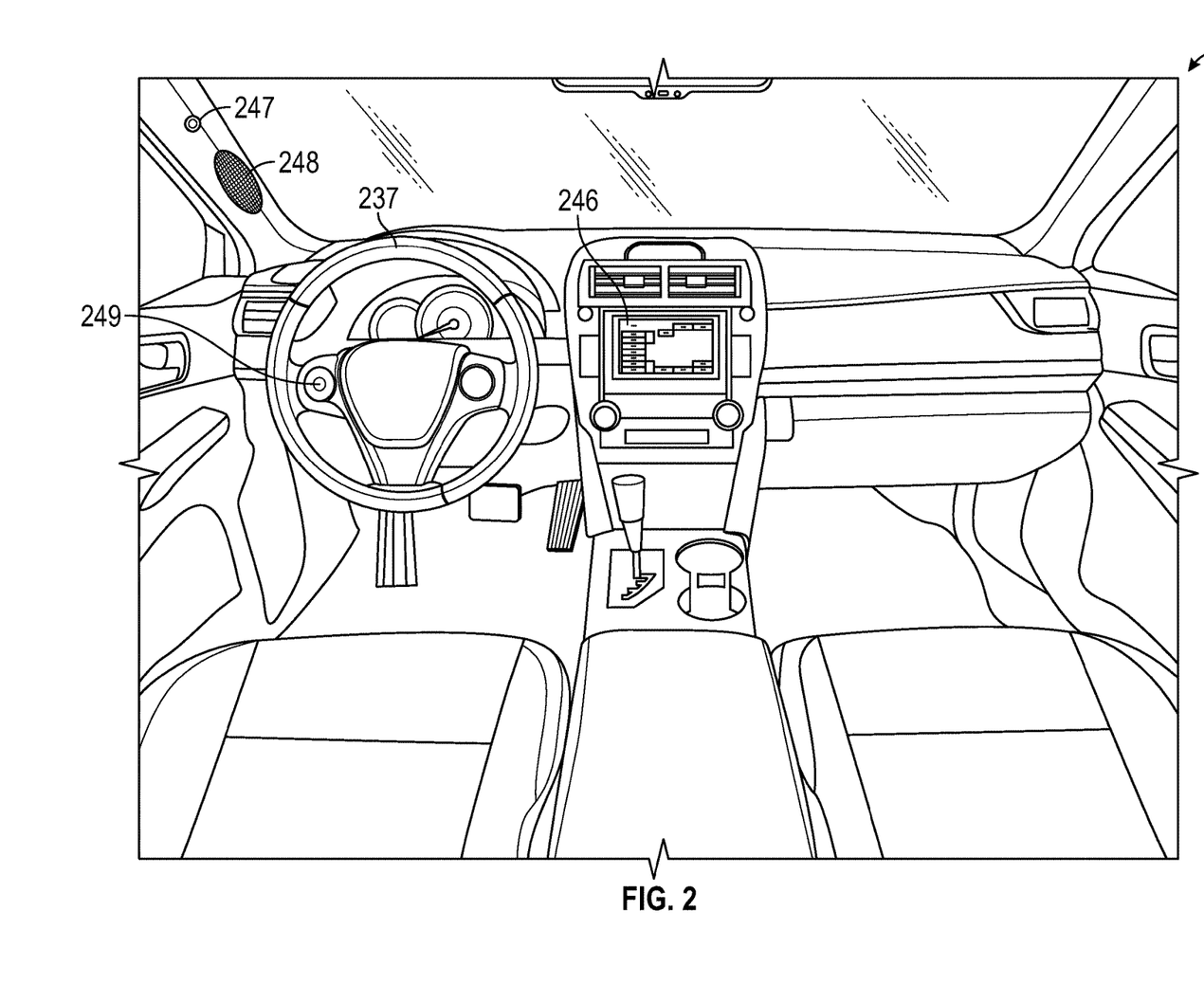
FIG. 2 illustrates an interior of an exemplary autonomous vehicle including a user interface system to receive subjective data as an input from a user, according to examples of the disclosure.

FIG. 2 illustrates an interior of an exemplary autonomous vehicle including a user interface system 200 to receive subjective data as an input from a user of the vehicle, according to examples of the disclosure. In some examples, user interface system 200 may include a one or more microphones 247, 248 to record feedback or subjective data from the vehicle's user as a vocal command or spoken description. In some examples, subjective data may include the user's feedback regarding qualitative data such as the overall quality of the autonomous driving maneuver (e.g., the user's satisfaction of the maneuver generally), validity or necessity of the autonomous driving maneuver (e.g., whether an automatic braking procedure seemed to be a mistake or a response to an object not in fact present in the vehicle's surroundings), severity of the autonomous driving maneuver (e.g., whether the vehicle automatically applied brakes more heavily than necessary), how readily the user could have taken control during the maneuver, and/or whether the autonomous driving maneuver exposed the user to additional or unnecessary danger, among other possibilities. In some examples of process 300, a user may input subjective feedback as a yes or no answer (e.g., to indicate whether a maneuver was justified), a numerical score (e.g., as an integer from zero to ten indicating how severe an autonomous maneuver seemed to the user) and the like. For example, user interface system 200 may prompt a user to describe a completed autonomous maneuver using one or more specified terms (e.g., valid, invalid, appropriate, controllable, uncontrollable, among other possible terms) and may record the term spoken by the user. In some examples, user interface system may include touch-input devices (e.g., several buttons) 249 disposed on a steering wheel 237 and/or a touchscreen 246 (e.g., as part of the vehicle's infotainment system) to enable a user to input subjective feedback regarding operation of the autonomous vehicle system and/or its autonomous maneuvers. For example, the vehicle user may input subjective feedback by touching one of several descriptions of autonomous vehicle performance presented on touch screen 246, or by selecting the description via buttons 249. Alternatively or in addition, the user may input a subjective feedback to describe an autonomous maneuver by using buttons 249 and/or touch screen 246 to select keys of a virtual keyboard displayed on the touchscreen 246. User interface 200 may operate with a vehicle controller (e.g., vehicle control system 100) to synchronize and/or associate the user's feedback regarding the vehicle's qualitative performance of a specific maneuver (subjective data) with objective data collected in response to the same maneuver.

Figure 3:
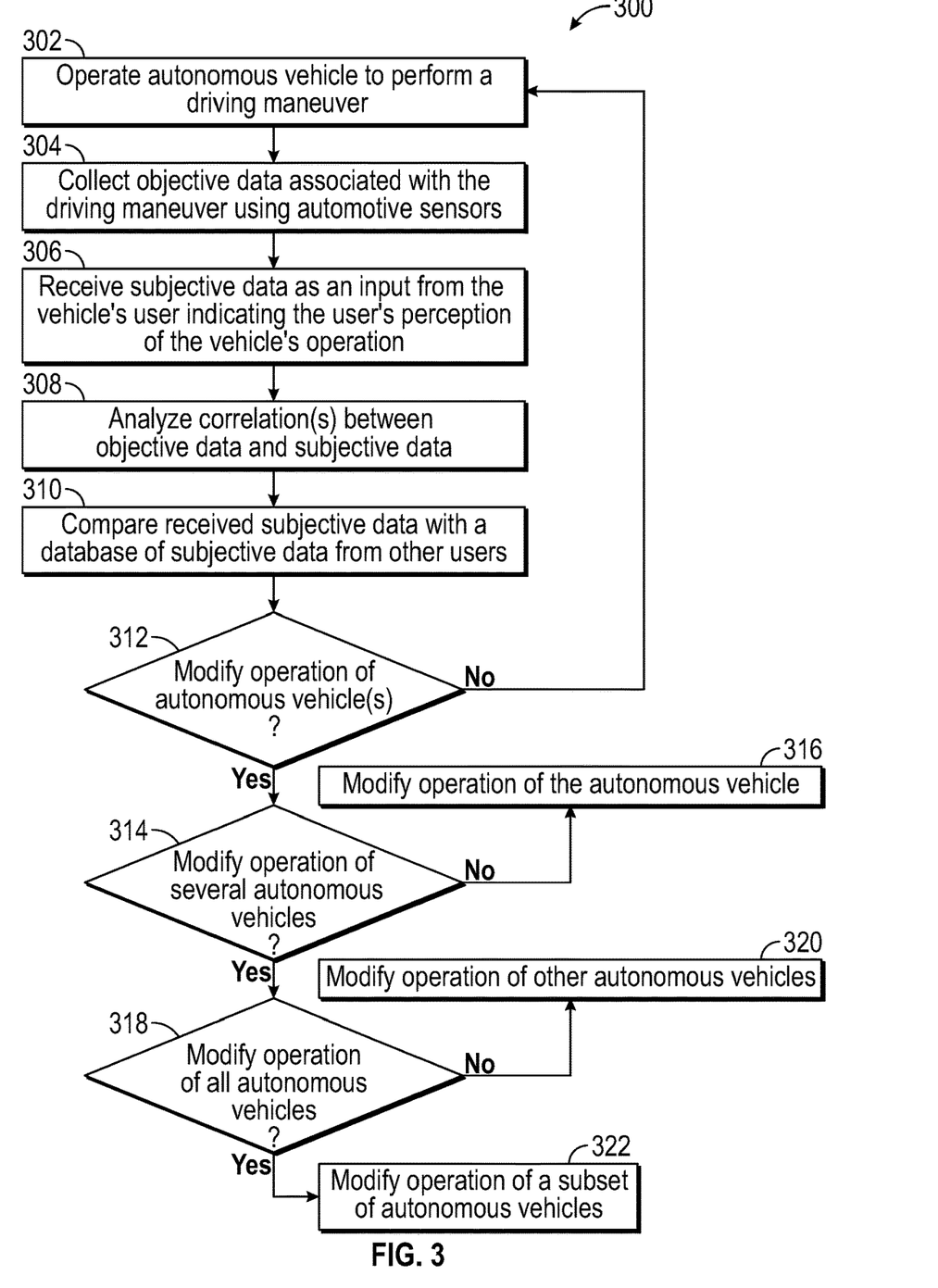
FIG. 3 illustrates an example process for controlling autonomous operation of one or more vehicles based on feedback from the vehicles' users, according to examples of the disclosure.

FIG. 3 illustrates an example process 300 for controlling autonomous operation of one or more vehicles based on feedback from the vehicles' users, according to examples of the disclosure. Some examples of process 300 may be performed entirely by an autonomous vehicle system, a vehicle controller or a vehicle control system. Some examples of process 300 can be split or offloaded between an autonomous vehicle system and a server, a mobile computing device, cloud database, and the like, as described in greater detail with reference to FIG. 1 and FIG. 4. For example, one or more autonomous vehicle systems may partially perform one or more steps of process 300 (e.g., steps 302, 304, and 306), and a server can receive objective data (e.g., a vehicle type, a number of vehicle occupants, a vehicle mileage, camera data, radar data, LIDAR data, GPS data, temperature data, weather data, brake activity, accelerator activity, a steering angle, a torque input, driver monitoring info and/or vehicle diagnostics data, among other possibilities) and subjective data (e.g., user feedback regarding an autonomous driving maneuver according to one or more of, general satisfaction, validity, severity and/or expose, among other possibilities) from the one or more autonomous vehicle systems, and can perform one or more remaining steps of process 300 (e.g., steps 308-322). Further, some examples of process 300 can occur each time the autonomous vehicle system 100 performs an autonomous driving maneuver. Alternatively or in addition, some examples of process 300 can occur fewer than every time the autonomous vehicle system performs an autonomous driving maneuver. For example, process 300 may occur once the autonomous vehicle system has performed a specified number of autonomous driving maneuvers (e.g., every 5 maneuvers). As another example, process 300 may occur according to specified intervals of time, such as every two minutes, every ten minutes, or every hour. Additionally, some examples of process 300 may occur every time the autonomous vehicle system performs an autonomous driving maneuver or after a specified time has elapsed since process 300 last occurred, and may occur at the earlier of the two.

At 302, the vehicle performs an autonomous driving maneuver, a driving assistance maneuver, or an autonomous driving event while a user of the vehicle (e.g., a driver, a passenger, etc.) is driving in the vehicle. For example, the vehicle may autonomously (or semi-autonomously) perform one or more of the following maneuvers: predictive collision mitigation (PCM) to alter the vehicle's velocity (e.g., bringing the vehicle to a stop) and/or steer the vehicle to avoid or mitigate a collision, change road position (e.g., changing lanes, moving to the shoulder, and the like) to autonomously navigate the vehicle to a driver's destination, altering a route of the vehicle to avoid a hazard or heavy road traffic, disengaging one or more autonomous vehicle controls (e.g., engaging a manual or user control of the vehicle) in response to a malfunctioning sensor, configuring the vehicle in a driving mode (e.g., sport mode, eco mode, safety mode, etc.) to increase driver safety in response to rainy weather or to conserve fuel in heavy road traffic, changing a configuration of the vehicle's engine, and/or engaging (or disengaging) one or more vehicle features or functions (e.g., windshield wipers, vehicle lights, airbags or safety systems generally, etc.) to respond to the autonomous vehicle system's environment or other vehicles generally, among other possibilities. In some examples of process 300, the autonomous vehicle system 100 may initiate the autonomous driving maneuver at 302 in response to data from sensors 106. For example, the autonomous vehicle system 100 may receive data from sensors 106 (e.g., LIDAR, radar, camera data, and the like as described for FIG. 1 above) indicating an object located in the vehicle's blind spot, and the autonomous vehicle system 100 may respond by autonomously altering its velocity, position, or mirror configuration (e.g., using controller 120 to activate actuator systems 130 such as motor 131, engine 132, system steering 137, and system mirror controls (not shown)) to increase the user's visibility of the detected object. As another example, sensors 106 of autonomous vehicle system 100 may indicate an object in the vehicle's path, and may engage a predictive collision mitigation system to autonomously slow, steer around and/or stop the autonomous vehicle system 100 (e.g., using controller 120 to engage actuator system 130 such as brakes 136 and steering system 137) to avoid a collision with the object indicated by sensors 106.

At 304, the autonomous vehicle system (or the server in communication with the autonomous vehicle system) may use one or more automotive sensors to collect objective data describing the vehicle's operation and the surroundings associated with the maneuver performed at 302. For example, the autonomous vehicle system may collect objective data that includes sensor data corresponding to the condition that caused the vehicle to initiate the maneuver, sensor data that describes the vehicle's operation before, during and after the maneuver, and sensor data that describes the vehicle's surroundings associated with the maneuver (e.g., the scenario data such as weather data, traffic data, etc.). Examples of objective data may include: vehicle type (e.g., model, style, etc.), number of occupants, mileage data, service history, camera/video recordings, radar data, LIDAR data, GPS data, temperature data, environmental data (e.g., precipitation, ambient luminosity, humidity, etc.), braking data, accelerator data, steering angle, torque input, driver monitoring info, vehicle diagnostics data (e.g., the vehicle's health or the condition of the vehicle's components), column torque data, vehicle speed, and/or inertial measurement data, among other possibilities. As another example, the vehicle's sensors may indicate an object in the vehicle's path, and the vehicle may autonomously operate to avoid the object, and may collect objective data specific to the vehicle (and/or the object) and its operation as it maneuvered to avoid the object.

At 306, the vehicle (or vehicle control system) receives subjective data as an input from the vehicle's user (e.g., input to the vehicle's onboard computer) indicating the user's subjective evaluation of the autonomous maneuver. In some examples, subjective data may include the user's feedback regarding qualitative data such as the overall quality of the autonomous driving maneuver (e.g., the user's satisfaction of the maneuver generally), validity or necessity of the autonomous driving maneuver (e.g., whether an automatic braking procedure seemed to be a mistake or a response to an object not in fact present in the vehicle's surroundings), severity of the autonomous driving maneuver (e.g., whether the vehicle automatically applied brakes more heavily than necessary), how readily the user could have taken control during the maneuver, and/or whether the autonomous driving maneuver exposed the user to additional or unnecessary danger, among other possibilities. In some examples of process 300, a user may input subjective feedback as a yes or no answer (e.g., to indicate whether a maneuver was justified), a numerical score (e.g., as an integer from zero to ten indicating how severe an autonomous maneuver seemed to the user) and the like. As a specific example, after and in response to performing an autonomous lane-keeping maneuver, touch screen 246 of user feedback system 200 may prompt the user to input subjective data, and the user may input the subjective data by speaking an integer from zero to ten, to indicate the user's overall satisfaction with the lane-keeping maneuver, and microphones 247, 248 may record the integer spoken by the user (e.g., in memory 116). In some examples, the subjective data may indicate the user strongly believed that the vehicle performed an unnecessary maneuver, possibly because the autonomous vehicle system (or vehicle sensors 106) incorrectly interpreted the autonomous vehicle system's surroundings (e.g., interpreted a tunnel entrance to be an object blocking the vehicle's path). As another specific example, subjective data may include a user's score of the vehicle's controllability or whether the user thought that he had the ability to interject and control the maneuver, if he wanted to. In some examples, a user may assign a low controllability score to a maneuver to indicate that during the maneuver the vehicle's safety systems, or the rapidity of the vehicle's operation, restricted the user's ability to manually control the vehicle. Additionally, some examples of subjective data may include a metric of how dangerous the user perceived the vehicle's maneuver to be. More specifically, the vehicle may prompt the user to select a danger value from a specified range of values to describe the danger of the autonomous maneuver as perceived by the user.

As described in greater detail with reference to FIG. 1 above, some examples of the autonomous vehicle system may be in communication with a server as described with reference to wireless transceiver 104 of FIG. 1, and may communicate objective data (e.g., one or more characteristics of a vehicle and/or its surroundings as described by the vehicle's sensors, such as a vehicle's speed, mileage, make, model and/or ambient weather, among other possibilities) and subjective data (e.g., user feedback regarding an autonomous driving maneuver according to one or more of, general satisfaction, validity, severity and/or expose, among other possibilities) to the server as part of process 300 (e.g., in steps 304 and 306). The user may input subjective data using user interface system 200, as described in greater detail above with reference to FIG. 2, and the server may synchronize that subjective data with corresponding the objective data (e.g., collected at step 304), and the synchronized data may describe the same autonomous maneuver performed by the autonomous vehicle system. Further, the synchronized data may describe the same autonomous maneuver according to two different perspectives, the objective data may describe the autonomous maneuver according to the autonomous vehicle system (e.g., according to data from sensors 106 and instructions of onboard computer 110) and the subjective data may describe the autonomous maneuver according to the user's subjective experience (e.g., according to the user's perspective of the vehicle's surroundings and its operation). In some examples, the server may aggregate objective data and subjective data that the server receives from one or more autonomous vehicle systems. As a specific example, the server may organize objective data according to the vehicle's velocity during the autonomous maneuver (e.g., the server can arrange objective data in a linearly increasing fashion to form an x-axis), and may organize the corresponding subjective data as a scatter plot or function of vehicle velocity for each type of subjective data received (e.g., a scatter plot of subjective data with respect to vehicle velocity for severity, validity, etc.)

At 308, the server may analyze one or more correlations between the objective data collected via automotive sensors and the subjective data received at step 306. In some examples, analysis 308 may be a statistical analysis of aggregate data from several autonomous maneuvers, and possibly several vehicles and/or vehicle users. For example, subjective data may indicate that several users believed several similar autonomous maneuvers were unnecessary, and may be analyzed alongside objective data to determine one or more correlations between the vehicle's configuration and the user's belief that the maneuver was unnecessary. And in some examples, analysis of step 308 may identify one or more possible explanations of why several autonomous maneuvers were performed that users believed to be unnecessary. For example, subjective data from several vehicle users may indicate invalid autonomous braking maneuvers, and corresponding objective data from the users' vehicles may indicate heavy rainfall at the time of the invalid autonomous braking maneuver, and the server may determine a correlation between the objective data indicating heavy rainfall and the subjective data indicating invalid autonomous braking maneuvers. As another example, subjective data from one or more users may indicate generally poor performance of their vehicles' automatic lane-keeping maneuver, and the corresponding objective data may indicate a position or stretch of road in common to each of the users, and the server may determine a correlation between the poor lane keeping performance and the position or stretch of road indicated by the objective data. In some examples, correlations between objective data and subjective data may be determined according to one or more of the following statistical measurements: a correlation coefficient (i.e., Pearson's correlation coefficient), rank correlation coefficients (e.g., Spearman's rank correlation coefficient and Kendall's rank correlation coefficient) and/or a randomized dependence coefficient, among other possibilities.

In some examples of process 300, at step 308 the server may analyze correlations between objective and subjective data to determine what objective data describing an autonomous vehicle system is most strongly correlated with positive subjective data. For example, the control system may analyze objective data and subjective data from several instances of automatic breaking maneuvers and may determine that users rarely input positive subjective data where the automatic breaking occurred with a severity exceeding a particular threshold (e.g., where the autonomous vehicle system decelerated at or above the particular threshold). In such an example, the server may determine that users prefer an automatic braking maneuver to occur with less than the determined severity, or not at all, and the server may modify autonomous braking maneuvers accordingly. As another example, the server may analyze objective data and subjective data of autonomous lane changes performed by one or more different models of autonomous vehicle systems, and may observe a correlation between a control algorithm common to certain models of the autonomous vehicle system and positive subjective data when compared to the subjective feedback for a different control algorithm common to one or more different models of the autonomous vehicle system. In such an example, the server may determine that users typically prefer the autonomous lane changes performed using the control algorithm of the first models of the autonomous vehicle system when compared against autonomous lane changes performed with the different control algorithm of the second models of the autonomous vehicle system.

In some examples, the server may utilize collected data and/or results of analysis performed at steps 308 and/or 310 to predict (or forecast) one or more errors in the autonomous vehicle system's performance of an autonomous driving maneuver, such as an unjustified automatic breaking maneuver, an excessively severe swerving maneuver, a dangerous autonomous lane change, among other possibilities. The server may predict errors in one or more autonomous maneuvers performed by autonomous vehicle systems to verify the accuracy of conclusions from process 300 with empirical data indicating how likely the errors are and collected after the errors were predicted. In one example, the server may determine based on analysis of data communicated from several autonomous vehicle systems that autonomous lane keeping is strongly correlated with negative subjective data along a specified portion of a particular road. In the example, the server may predict a high probability of negative subjective feedback corresponding to objective data of any autonomous lane keeping maneuver performed by autonomous vehicles located within the specified portion of road. Further, in the example, the server may predict the error in autonomous lane keeping until the portion of that particular road is repaired (e.g., until lanes are more clearly marked), or until the manner in which autonomous vehicle systems perform autonomous lane keeping maneuvers is changed (e.g., new algorithms allowing lane keeping independent of a road's condition), and the server may use the predicted error to determine whether to recommend use of the autonomous lane keeping maneuver along the particular portion of road. As a general example, the server 308 may identify that a specific combination of objective data (e.g., vehicle type, temperature, and traffic conditions) is often associated with subjective data indicating an error in the autonomous vehicle system's performance of an autonomous driving maneuver. In some examples, the system may record and/or aggregate such trends or historical data capable of predicting (e.g., statistical forecasting) failures of one or more autonomous vehicles. For example, the server may determine an average probability of an error occurring during a certain type of autonomous maneuver, such as by using determined probabilities of error occurring while each of the various makes and/or models of the autonomous vehicle system performing the maneuver. As another example, the server can determine an average probability of an error occurring while a particular make and/or model of the autonomous vehicle system performs any autonomous maneuver, such as by using determined probabilities of an error occurring in the various autonomous maneuvers performed by the make and/or model of the autonomous vehicle system.

In some examples, process 300 may enable the server to be self-validating, in other words, to determine the accuracy of the results from the server's analysis in step 308. For example, once enough data has been collected, the server may estimate a probability of receiving a particular combination of objective data and corresponding subjective data based on the analysis of objective and subjective data, such as estimating a probability that an autonomous vehicle system performing predictive collision mitigation at a particular location will correspond to positive subjective data. And the server may self-validate by using additional data communicated from autonomous vehicle systems engaging predictive collision mitigation at the specified point to empirically determine a difference between the estimated probability and observed results. As another example, the server can estimate an average user satisfaction corresponding to autonomous vehicle steering or autopilot during a specified time frame (e.g., 3:00 PM to 8:00 PM) and a particular portion of road (e.g., along the I-5 Freeway between Santa Ana and Los Angeles), and may verify the estimated average user satisfaction based by comparing it against subjective data indicating actual user satisfaction regarding autonomous vehicle steering performed by an autonomous vehicle system during the specified time and within the specified region.

At 310, the server compares subjective data received from the vehicle user with a database of subjective data from other vehicle users, which comparison may be used at step 314 to determine whether to modify more than the single autonomous vehicle system that performed the autonomous driving maneuver of step 302. Further, in some examples, at step 310 the server may validate whether a correlation of objective data and subjective data determined in step 308 is more than one or more vehicle users' idiosyncratic preferences regarding autonomous maneuvers performed by an autonomous vehicle system. In some examples of process 300, at step 310, the server can compare subjective data received from an autonomous vehicle's user regarding an autonomous maneuver against subjective data regarding similar autonomous maneuvers and received from other vehicle users. The server may compare subjective data from various vehicle users by determining an average subjective data for each type of autonomous maneuver. For example, the server may determine an overall average severity score (between zero and ten) received from users for an autonomous breaking maneuver, based on all subjective data received regarding severity of an autonomous braking maneuver. The server may then determine user average severity scores for autonomous breaking for each vehicle user for which subjective data has been received. The server can determine a user's sensitivity to autonomous breaking based in part on how much that user's average severity score for autonomous braking differs from the overall average severity score for autonomous braking. As can be appreciated, a user's preferences and/or sensitivity to particular autonomous maneuvers may be determined according to increasingly complex methods, such as those considering most common subjective data, the various circumstances of the autonomous maneuver (e.g., the exact conditions that necessitated the autonomous maneuver) and the like. For example, at step 310, the server can compare a user's subjective data indicating that an autonomous lane change was too abrupt with subjective data regarding the timing of autonomous lane changes and received from other users. More specifically, the subjective data may be compared where sufficient similarities between the corresponding objective data of each user's subjective data exist, such as where the lane change occurred in similar amounts of vehicle traffic, similar weather, and the make and/or model of the autonomous vehicle systems that performed the two autonomous lane changes are substantially identical. Alternatively or in addition, some examples of process 300 may include the server classifying vehicle users according one or more characteristics (e.g., age, average time spent driving, gender, common passengers, etc.) and the server may compare data associated with users within and across such classifications. For example, the server can compute an average satisfaction with autonomous maneuvers generally for a user in a middle aged category to compare against an average satisfaction with autonomous maneuvers generally of a vehicle user less than 25 years of age.

Based on the objective data collected, subjective data received, and the results of the analysis of correlations between the two, the system may operate in the steps described below (e.g., 312-322) to perform one or more of: modify the autonomous vehicle system that performed the autonomous driving maneuver at step 302, modifying some subset of autonomous vehicle systems, in addition to modifying the autonomous vehicle system that performed the autonomous driving maneuver of step 302 or modifying operation of all autonomous vehicle systems. The system may modify only the autonomous vehicle system of the autonomous driving maneuver in step 302 in examples where the objective and subjective data only indicate idiosyncratic preferences of that vehicle's user. For example, where the objective and subjective data of the user show above average severity for automatic braking. The system may modify a subset of all autonomous vehicle systems where an incremental change is desired, such as to improve autonomous lane keeping maneuvers performed by autonomous vehicle systems that are likely to drive on a particular portion of road. What follows will describe in greater detail the logic controlling whether to modify one or more autonomous vehicle systems based on the above steps.

At 312, the server can determine whether to modify one or more autonomous vehicle systems based on the results of its analysis at step 308 and/or 310. In some examples, the server may determine at step 312 to forgo modifying any autonomous vehicle systems or their operation. For example, the control system may forgo modifying any autonomous vehicles' operation in response to the analysis at step 308 indicating that additional data for existing configurations is required prior to modifying one or more autonomous vehicles. For example, the server may determine that it has received insufficient data to characterize data received after modifying autonomous vehicle system(s), and that to modifying one or more autonomous vehicle systems would frustrate rather than facilitate determining correlations between previously received objective data and subjective data. In some examples, the server may determine to modify only the autonomous vehicle system that performed the autonomous driving maneuver of step 302. In some examples, the server may modify a subset of the autonomous vehicle systems, such as at step 320 described below. For example, the server may determine to test an increase in the severity of automatic brakes used to avoid or mitigate a collision on a limit number of autonomous vehicle systems, and may undo the modification or similarly modify all unmodified autonomous vehicle systems, based subjective data received from the modified vehicles. In some examples, the server may determine to modify all autonomous vehicle systems. For example, the server can determine to modify all autonomous vehicle systems to autonomously monitor blind spots with greater sensitivity (assuming a larger blind spot) and to modify autonomous reaction to an object in the user's blind spot, increasing the extent of the autonomous vehicle's reaction to the object (e.g., prioritize user's visibility above the user's immediate convenience). In some examples, the server can determine to modify one or more autonomous vehicle systems incrementally to observe resulting changes in the operation of the modified autonomous vehicle systems and/or in the data of autonomous maneuvers performed by the modified autonomous vehicle system. For example, the server may implement a slight decrease in the reaction time of a subset of all autonomous vehicle systems when implementing autonomous braking, and the server may monitor subjective data associated with the modified vehicles to observe users' reaction to the slight decrease in the vehicles' reaction times. Some examples of how the server can modify autonomous vehicle systems include altering one or more of: warning thresholds (e.g., a distance threshold between the vehicle and a detected object for warning the user of the object), activation speeds (e.g., vehicle speed at which safety features such as automatic driver alertness monitoring active), condition(s) for suppressing feature(s) (e.g., hazardous weather causing the vehicle to automatically switch from a sport driving mode to a safety driving mode), event duration (e.g., causing a vehicle to autonomously change lanes more rapidly or spend less time in the transition from one lane to another), control algorithms (e.g., introducing new states of operation in the vehicle's software), vehicle firmware (e.g., updating firmware to improve noise filtering of sensor data) and/or sensor configurations (or sensor calibrations), among other possibilities.

At 314, the vehicle control system determines whether to modify more than one vehicle, or to modify only the vehicle that performed the autonomous maneuver at step 302. For example, the server can use the results of step 310 to determine whether the determined changes are based on preferences specific to the vehicle's user. Further, in some examples, the server may determine not to modify the adaptive cruise control maneuver of the autonomous vehicle system that performed the autonomous maneuver of step 302 based on idiosyncratic preference for larger than average following distance, and the server may determine to modify the adaptive cruise control maneuver other autonomous vehicle systems to decrease the vehicles' follow distance during adaptive cruise control and to receive and analyze the resulting subjective data from the vehicles' users. As another specific example, the system may determine that the user is more sensitive to abrupt changes in velocity than the average user, and may determine at 314 to change only this user's vehicle to operate according to the user's sensitivity (and may forgo modifying other autonomous vehicle systems). In some examples, the server may determine to modify only the user's vehicle and no others based on a parameter or characteristic specific to the user's vehicle. In some examples, the server may determine that subjective data received from the vehicle's user indicates idiosyncratic preferences of the user according to one or more of:

At 316, the server determines whether to modify the vehicle that performed the maneuver of step 302. In many examples, the vehicle's operation may be modified based on the subjective data received at 306, and may be modified to more closely align the vehicle's operation with the vehicle user's preferences expressed in the subjective data. For example, the user's subjective data may indicate a preference for faster than average autonomous lane changes, and the control system may modify the duration associated with lane changes for the user's vehicle.

At 318, the vehicle control system determines whether to modify operation of all autonomous vehicles (e.g., an entire fleet of autonomous vehicles), or to modify less than every vehicle. In some examples, the server may determine to modify all autonomous vehicle systems in response to determining a correlation between objective data common to all autonomous vehicle systems and corresponding with negative subjective data with data validating the determined correlation. For example, the server can determine such a correlation between minimum object size in the path of an autonomous vehicle system for activating a predictive collision mitigation system, and the server may increase the minimum size to active the predictive collision mitigation system to avoid false positives from small debris on a road. Further, in some examples, modifying operation of all autonomous vehicle systems may include modifying autonomous vehicle software and/or control algorithm(s) common to substantially all autonomous vehicles, as mentioned previously. In some example, the server may determine to modify only a subset of autonomous vehicle systems based on a correlation between objective data and subjective data common to fewer than all autonomous vehicle systems. For example, the operation of multiple autonomous vehicles may be modified in response to a correlation indicating that only a portion of autonomous vehicles perform invalid maneuvers (e.g., false detection of obstacles). At 320, the server can modify a subset of the autonomous vehicle systems. For example, the server may determine a correlation between rate of autonomous acceleration by the autonomous vehicles and overall user satisfaction, but the server may determine that additional data is required to further validation the correlation, and a subset of autonomous vehicle systems may be modified with increased rates of autonomous acceleration so the server can receive and analyze data from the subset of modified autonomous vehicles. At 322, the vehicle control system may modify operation of all autonomous vehicles (e.g., cause each autonomous vehicle to update vehicle software, etc.) after determining to do so at step 318. For example, vehicle control system may modify autonomous operation of all vehicles in response to discovering an error in the operation of vehicle control software common to every vehicle (e.g., an unnecessary delay prior to initiating an autonomous braking maneuver).

Figure 4:
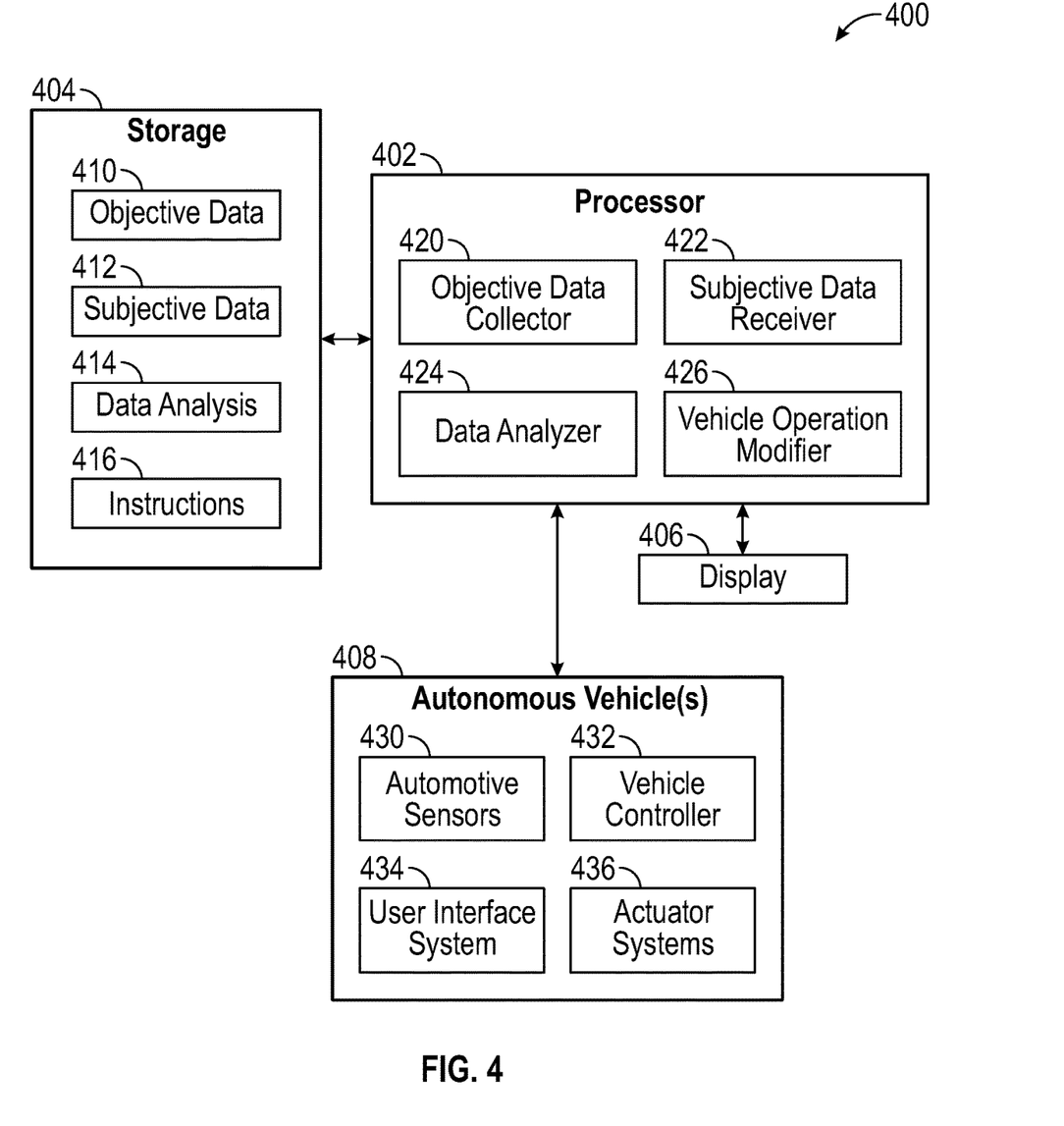
FIG. 4 illustrates an exemplary vehicle control system block diagram for controlling operation of one or more autonomous vehicles based on user feedback, according to examples of the disclosure.

FIG. 4 illustrates an exemplary vehicle control system block diagram 400 for controlling operation of one or more autonomous vehicles based on user feedback, according to examples of the disclosure. System 400 can include processor 402, storage 404, display 406, and autonomous vehicle(s) 408. Processor 402 is operatively coupled to storage 404 to enable the transfer of data between the processor 402 and the storage 404. Processor 402 is operatively coupled to display 406 to allow the processor 402 to visually present relevant information. Processor 402 is operatively coupled (or in communication with) the one or more autonomous vehicles 408 or with the vehicle controllers 432 (e.g., via wireless transceiver 104 of FIG. 1). The processor 402 controls and/or interface with components of the autonomous vehicles 408. For example, processor 402 may collect objective data 420 via automotive sensors 430, receiver user feedback or subjective data 422 via user interface system 434, and may control the operation of the autonomous vehicles 408 via vehicle controller 432 and actuator systems 436. Although FIG. 4 illustrates one processor 402, system 400 can be implemented with one or more computers including one or more processors running a multitude of software processes. In certain examples, each software process can be executed on a different CPU in a computing cluster or mainframe. Alternatively or in addition, some examples may implement processor 402 as hardware, firmware, software, or a combination thereof.

Processor 402 is configured to perform one or more processes described herein, including: operating an autonomous vehicle, collecting objective data from one or more automotive sensors (e.g., via objective data collector 420), receiving subjective data input by the user (e.g., via subjective data receiver 422), aggregating and/or organizing objective data and corresponding subjective data, analyzing and/or comparing data to determine improved vehicle configurations (e.g., via data analyzer 424), identifying the user's preferences and/or sensitivity by comparing the user's subjective data with a database of subjective data (e.g., via data analyzer 424), determining whether to modify one or more vehicles, determining whether to modify the user's vehicle, other vehicles, or all vehicles, and/or modifying one or more vehicles (e.g., via vehicle operation modifier). In some examples, the vehicle control system may be in communication with onboard computers of several autonomous vehicles, and may control one or more aspects of the vehicles (individually or collectively) based on commands sent to the vehicle's onboard computers. Any or all of the above processes can be performed automatically with minimal or no user input. These processes may include, or be substantially identical to, the processes described in greater detail with reference to process 300 above.

Storage 404 includes one or more non-transitory computer readable storage media, such as a solid-state drive, hard disk drive, a random access memory (RAM), or other storage infrastructure. Storage 404 may include objective data 410, subjective data 412, data analysis 414, and instructions 416 for the processor 402. Objective data 410, subjective data 412, and data analysis (or analysis results) 414 are each described in greater detail in reference to FIG. 3. The processor 402 may include one or more modules, features, and/or programs configured to facilitate (or enable) simulation of an autonomously operating vehicle using the contents of storage 404. For example, the processor 402 may include an objective data collector 420, a subjective data receiver 422, a data (e.g., subjective data and/or objective data) analyzer 424, and a vehicle operation modifier 426, and each of them are described in greater detail as steps of process 300 of FIG. 3.

A system is disclosed. The system can comprise: one or more sensors configured to sense one or more parameters of a vehicle; one or more processors operatively coupled to the one or more sensors; and a memory including instructions, which when executed by the one or more processors, cause the one or more processors to perform a method comprising:

causing the vehicle to perform an autonomous vehicle maneuver in accordance with a determination by an autonomous vehicle system; detecting, via the one or more sensors, objective data of the one or more parameters of the vehicle associated with the autonomous vehicle maneuver; receiving subjective data input by one or more users of the vehicle corresponding to an evaluation of the autonomous vehicle maneuver by the one or more users of the vehicle; and determining whether to adjust a configuration of the autonomous vehicle system based on the objective data and the subjective data. Additionally or alternatively, in some examples, additional objective data is detected and additional subjective data is received each time a vehicle performs an autonomous vehicle maneuver. Additionally or alternatively, in some examples, detecting objective data comprises determining one or more of: a vehicle type, a number of vehicle occupants, a vehicle mileage, camera data, radar data, LIDAR data, GPS data, temperature data, weather data, brake activity, accelerator activity, a steering angle, a torque input, driver monitoring info, vehicle diagnostics data, steering angle and column torque sensor data, a vehicle speed, and inertial measurement data. Additionally or alternatively, in some examples, subjective data includes data input by a user that includes the user's qualitative evaluation of an autonomous vehicle maneuver according to one or more of validity, severity, vehicle controllability, and user exposure. Additionally or alternatively, in some examples, an autonomous vehicle maneuver comprises one or more of: autonomous lane keeping, autonomous blind spot monitoring, adaptive cruise control, evasive steer-assist, and predictive collision mitigation systems. Additionally or alternatively, in some examples, the method further comprises determining a sensitivity of a vehicle user to one or more autonomous vehicle maneuvers by comparing subjective data received from the vehicle user with subjective data received from several other vehicle users. Additionally or alternatively, in some examples, the method further comprises modifying one or more parameters of the autonomous vehicle system to perform the one or more autonomous vehicle maneuvers according to the determined sensitivity of the vehicle user. Additionally or alternatively, in some examples, the method further comprises: determining a modification of one or more parameter s of the autonomous vehicle system, based on a correlation of the detected objective data and the received subjective data indicating the modification of the one or more parameters, to improve the autonomous vehicle system's performance of one or more autonomous driving maneuvers. Additionally or alternatively, in some examples, modifying one or more parameters of the autonomous vehicle system comprises changing one or more of a warning threshold, an activation speed, a condition for feature suppression, a duration from performing an autonomous maneuver, a control algorithm, vehicle firmware, vehicle software, or vehicle sensor settings. Additionally or alternatively, in some examples, subjective data is received from the vehicle user from one or more of a microphone, a touchscreen, navigation buttons, a keyboard, or a mobile computing device. Additionally or alternatively, in some examples, the method further comprises: predicting one or more failures of the one or more autonomous vehicle systems based on the detected objective data and the received subjective data.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
one or more sensors configured to sense one or more parameters of a vehicle;
one or more processors operatively coupled to the one or more sensors; and
a memory including instructions, which when executed by the one or more processors, cause the one or more processors to perform a method comprising:
causing the vehicle to perform an autonomous vehicle maneuver in accordance with a determination by an autonomous vehicle system;
detecting, via the one or more sensors, objective data of the one or more parameters of the vehicle associated with the autonomous vehicle maneuver;
receiving subjective data input by one or more users of the vehicle corresponding to an evaluation of the autonomous vehicle maneuver by the one or more users of the vehicle;
determining whether to adjust a configuration of the autonomous vehicle system based on the objective data and the subjective data; and
determining a sensitivity of a vehicle user to one or more autonomous vehicle maneuvers by comparing subjective data received from the vehicle user with subjective data received from several other vehicle users.

2. The system of claim 1, wherein additional objective data is detected and additional subjective data is received each time a vehicle performs an autonomous vehicle maneuver.

3. The system of claim 1, wherein detecting objective data comprises determining one or more of: a vehicle type, a number of vehicle occupants, a vehicle mileage, camera data, radar data, LIDAR data, GPS data, temperature data, weather data, brake activity, accelerator activity, a steering angle, a torque input, driver monitoring info, vehicle diagnostics data, steering angle and column torque sensor data, a vehicle speed, and inertial measurement data.

4. The system of claim 1, wherein subjective data includes data input by a user that includes the user's qualitative evaluation of an autonomous vehicle maneuver according to one or more of validity, severity, vehicle controllability, and user exposure.

5. The system of claim 1, wherein an autonomous vehicle maneuver comprises one or more of: autonomous lane keeping, autonomous blind spot monitoring, adaptive cruise control, evasive steer-assist, and predictive collision mitigation systems.

6. The system of claim 1, wherein the method further comprises modifying one or more parameters of the autonomous vehicle system to perform the one or more autonomous vehicle maneuvers according to the determined sensitivity of the vehicle user.

7. The system of claim 1, wherein the method further comprises:
determining a modification of one or more parameter s of the autonomous vehicle system, based on a correlation of the detected objective data and the received subjective data indicating the modification of the one or more parameters, to improve the autonomous vehicle system's performance of one or more autonomous driving maneuvers.

8. The system of claim 7, wherein modifying one or more parameters of the autonomous vehicle system comprises changing one or more of a warning threshold, an activation speed, a condition for feature suppression, a duration from performing an autonomous maneuver, a control algorithm, vehicle firmware, vehicle software, or vehicle sensor settings.

9. The system of claim 1, wherein subjective data is received from the vehicle user from one or more of a microphone, a touchscreen, navigation buttons, a keyboard, or a mobile computing device.

10. The system of claim 1, wherein the method further comprises:
predicting one or more failures of the one or more autonomous vehicle systems based on the detected objective data and the received subjective data.

11. A vehicle comprising:
one or more sensors configured to sense one or more parameters of a vehicle;
one or more processors operatively coupled to the one or more sensors; and
a memory including instructions, which when executed by the one or more processors, cause the one or more processors to perform a method comprising:
causing the vehicle to perform an autonomous vehicle maneuver in accordance with a determination by an autonomous vehicle system;
detecting, via the one or more sensors, objective data of the one or more parameters of the vehicle associated with the autonomous vehicle maneuver;
receiving subjective data input by one or more users of the vehicle corresponding to an evaluation of the autonomous vehicle maneuver by the one or more users of the vehicle;
determining whether to adjust a configuration of the autonomous vehicle system based on the objective data and the subjective data; and
determining a sensitivity of a vehicle user to one or more autonomous vehicle maneuvers by comparing subjective data received form the vehicle user with subjective data received from several other vehicle users.

* * * * *